US009260199B2

(12) United States Patent
Sundararajan et al.

(10) Patent No.: US 9,260,199 B2
(45) Date of Patent: Feb. 16, 2016

(54) AIRCRAFT DATA PROCESSING AND TRANSMISSION SYSTEM

(71) Applicant: HONEYWELL INTERNATIONAL INC., Morristown, NJ (US)

(72) Inventors: Bharath Sundararajan, Tamilnadu (IN); Vijayshankaran Ramamoorthy Iyer, Glendale, AZ (US); Sathya Prakash Nilagiri, Andhra Pradesh (IN)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 0 days.

(21) Appl. No.: 14/451,980

(22) Filed: Aug. 5, 2014

(65) Prior Publication Data

US 2015/0239575 A1 Aug. 27, 2015

(30) Foreign Application Priority Data

Feb. 25, 2014 (IN) .............................. 939/CHE/2014

(51) Int. Cl.
*B64D 45/00* (2006.01)
*G06F 21/51* (2013.01)
(Continued)

(52) U.S. Cl.
CPC . *B64D 45/00* (2013.01); *G06F 8/61* (2013.01); *G06F 17/30011* (2013.01); *G06F 21/51* (2013.01)

(58) Field of Classification Search
CPC ..... G06F 8/61; G06F 17/30011; G06F 21/51; G06F 8/65; G01C 21/005; G01C 23/00; G01C 5/005; G05B 23/0264; G05D 1/0676; G05D 1/101; G07C 5/008; G08G 5/0021; G08G 5/0086; G08G 5/0045; G08G 5/06; H04L 45/12; H04L 45/123; H04L 65/605; H04L 65/607; H04L 65/608
USPC ............... 701/31.4; 707/104.1; 370/238, 389; 340/963, 970; 382/203
See application file for complete search history.

(56) References Cited

U.S. PATENT DOCUMENTS 5,233,604 A * 8/1993 Ahmadi ................ H04L 45/123
370/238
7,961,136 B2 6/2011 Stefani et al.
(Continued)

FOREIGN PATENT DOCUMENTS

EP 2290636 A1 3/2011
EP 2568460 A2 3/2013
EP 2575122 A2 4/2013

OTHER PUBLICATIONS

Kavi, K.M. et al.; Glass-Box: An Intelligent Flight Data Recorder and Real-Time Monitoring System; The University of Alabama in Huntsville, Dec. 2000.

(Continued)

*Primary Examiner* — James Trammell
*Assistant Examiner* — Sanjeev Malhotra
(74) *Attorney, Agent, or Firm* — Ingrassia Fisher & Lorenz, P.C.

(57) ABSTRACT

An aircraft data processing system includes a main transceiver, a data distributor, a plurality of data processors, and a display page maker. The main transceiver selectively receives aircraft data transmitted from a plurality of client aircraft and selectively transmits cockpit data to one or more client aircraft. The data distributor selectively receives the aircraft data received by the main transceiver and parses and distributes the aircraft data. The data processors receive a portion of the parsed aircraft data, process the aircraft data, and supply processed aircraft data. The display page maker receives the processed aircraft data from the plurality of processors and generates the cockpit data for selective transmission by the main transceiver to the one or more client aircraft. The cockpit data, when processed in a client aircraft, will render one or more images representative of at least portions of the processed aircraft data.

8 Claims, 3 Drawing Sheets

(51) Int. Cl.
   *G06F 17/30* (2006.01)
   *G06F 9/445* (2006.01)

(56) References Cited

U.S. PATENT DOCUMENTS

| | | | | |
|---|---|---|---|---|
| 2003/0206120 A1* | 11/2003 | Ishihara | G05D 1/0676 | 340/970 |
| 2006/0158350 A1* | 7/2006 | Glover | G01C 21/005 | 340/963 |
| 2006/0238376 A1* | 10/2006 | Khatwa | G01C 23/00 | 340/970 |
| 2007/0088467 A1 | 4/2007 | Knotts | | |
| 2009/0138516 A1* | 5/2009 | Young | G06F 8/65 | 707/104.1 |
| 2009/0138517 A1* | 5/2009 | McLain | G06F 17/30011 | 707/104.1 |
| 2009/0138518 A1* | 5/2009 | Rodgers | G06F 8/61 | 707/104.1 |
| 2009/0219932 A1* | 9/2009 | Kobayashi | H04L 65/605 | 370/389 |
| 2009/0285491 A1* | 11/2009 | Ravenscroft | G08G 5/06 | 382/203 |
| 2010/0023201 A1* | 1/2010 | Kinney | G07C 5/008 | 701/31.4 |
| 2010/0103022 A1 | 4/2010 | Stefani et al. | | |
| 2012/0218127 A1 | 8/2012 | Kroen | | |
| 2014/0013002 A1 | 1/2014 | Holstein et al. | | |
| 2014/0058591 A1 | 2/2014 | Schoonveld et al. | | |
| 2014/0075506 A1 | 3/2014 | Davis et al. | | |

OTHER PUBLICATIONS

O'Dell, R.L.; The Gulfstream G650 Aircraft Health and Trend Monitoring System; Sep. 2012.

Iridium; Flyht afirs UpTime; [http://www.iridium.com/products/FLYHTafirsUpTime.aspx; Apr. 25, 2014.

Extended EP search report for EP 15155146.2-1803 dated Jul. 7, 2015.

* cited by examiner

AIRCRAFT DATA PROCESSING AND TRANSMISSION SYSTEM

CROSS-REFERENCE TO RELATED APPLICATION

This application claims the benefit of India Provisional Patent Application No. 939/CHE/2014, filed Feb. 25, 2014, which is incorporated herein by reference.

TECHNICAL FIELD

The present invention generally relates to aircraft data processing, and more particularly relates to systems and methods for processing and transmitting aircraft data.

BACKGROUND

Presently, all aircraft data are processed onboard an aircraft and, when necessary, pilots are relied upon to make the final decision regarding most of the processed data. There are also systems onboard the aircraft that provide situational awareness during certain adverse weather conditions. These adverse conditions may arise, for example, during no- or low-visibility conditions, which may occur during precipitation, fog, snow squalls, and streamers. For such adverse weather conditions, pilots may be debriefed before departure from the airport. However, weather conditions can change dynamically, which means pilots need to make decisions based on available onboard information and, if there is connectivity with the ground, information provided from air traffic control (ATC). If the aircraft is flying over the ocean, communication with the ground may not be available.

In addition to the above, whenever an aircraft is flown below 2000 feet, the pilot needs to be very aware of the terrain. The pilot may receive warnings from an onboard terrain awareness system at various conditions. Such terrain awareness systems may provide warnings during various dynamic operations of the aircraft, and pilots may need to depend on such onboard systems. Yet, some aircraft are not equipped with such systems, and sometimes the onboard terrain databases may not have been updated.

The inability to adapt to dynamic conditions during flight can result in undesirable costs associated with, for example, message exchanges with the ground, increased fuel consumption, inefficient wear of aircraft parts, and the like.

Hence, there is a need for a system that can allows aircraft to readily adapt to dynamic conditions during flight without incurring undesirable costs associated with message exchanges with the ground and/or increased fuel consumption and/or inefficient wear of aircraft parts. The present invention addresses at least this need.

BRIEF SUMMARY

This summary is provided to describe select concepts in a simplified form that are further described in the Detailed Description. This summary is not intended to identify key or essential features of the claimed subject matter, nor is it intended to be used as an aid in determining the scope of the claimed subject matter.

In one embodiment, an aircraft data processing system includes a main transceiver, a data distributor, a plurality of data processors, and a display page maker. The main transceiver is adapted to selectively receive aircraft data transmitted from a plurality of client aircraft and to selectively transmit cockpit data to one or more client aircraft. The data distributor is coupled to selectively receive the aircraft data received by the main transceiver and is configured, upon receipt thereof, to parse and distribute the aircraft data. The data processors are in operable communication with the data distributor. Each data processor is coupled to receive, from the data distributor, a portion of the parsed aircraft data and is configured, upon receipt thereof, to process the portion of the parsed aircraft data it receives and supply processed aircraft data. The display page maker is coupled to receive the processed aircraft data from the plurality of processors and is configured, upon receipt thereof, to generate the cockpit data for selective transmission by the main transceiver to the one or more client aircraft. The cockpit data, when processed in a client aircraft, will render one or more images representative of at least portions of the processed aircraft data.

In another embodiment, an aircraft data processing system includes a plurality of aircraft transceivers, a main transceiver, a data distributor, a plurality of data processors, a display page maker, a web hosting server, a main client connection manager, and a main connection manager. Each aircraft transceiver is disposed in a client aircraft and is configured to selectively transmit aircraft data and receive cockpit data. The main transceiver is adapted to selectively receive aircraft data transmitted from a plurality of client aircraft and to selectively transmit cockpit data to one or more of the client aircraft. The data distributor is coupled to selectively receive the aircraft data received by the main transceiver and is configured, upon receipt thereof, to parse and distribute the aircraft data. The data processors are in operable communication with the data distributor. Each data processor is coupled to receive, from the data distributor, a portion of the parsed aircraft data and is configured, upon receipt thereof, to process the portion of the parsed aircraft data it receives and supply processed aircraft data. The display page maker is coupled to receive the processed aircraft data from the plurality of processors and is configured, upon receipt thereof, to generate the cockpit data for selective transmission by the main transceiver to the one or more client aircraft. The web hosting server is in operable communication with the display page maker, is coupled to receive the cockpit data, and is configured, upon receipt thereof, to at least temporarily store the cockpit data. The main client connection manager is in operable communication with the web hosting server. The main client connection manager is coupled to retrieve at least selected portions of the cockpit data from the web hosting server and is configured, upon receipt thereof, to supply the retrieved cockpit data for transmission to one or more client aircraft. The main connection manager is in operable communication with the main client connection manager and the main transceiver. The main connection manager is configured to determine an optimum transmission link, command the main transceiver to establish communication with one or more client aircraft via the optimum transmission link, and command the main transceiver to receive aircraft data from, and transmit the cockpit data to, one or more client aircraft. The cockpit data, when processed in a client aircraft, will render one or more images representative of at least portions of the processed aircraft data.

Furthermore, other desirable features and characteristics of the [system/method] will become apparent from the subsequent detailed description and the appended claims, taken in conjunction with the accompanying drawings and the preceding background.

BRIEF DESCRIPTION OF THE DRAWINGS

The present invention will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

Figure 1:
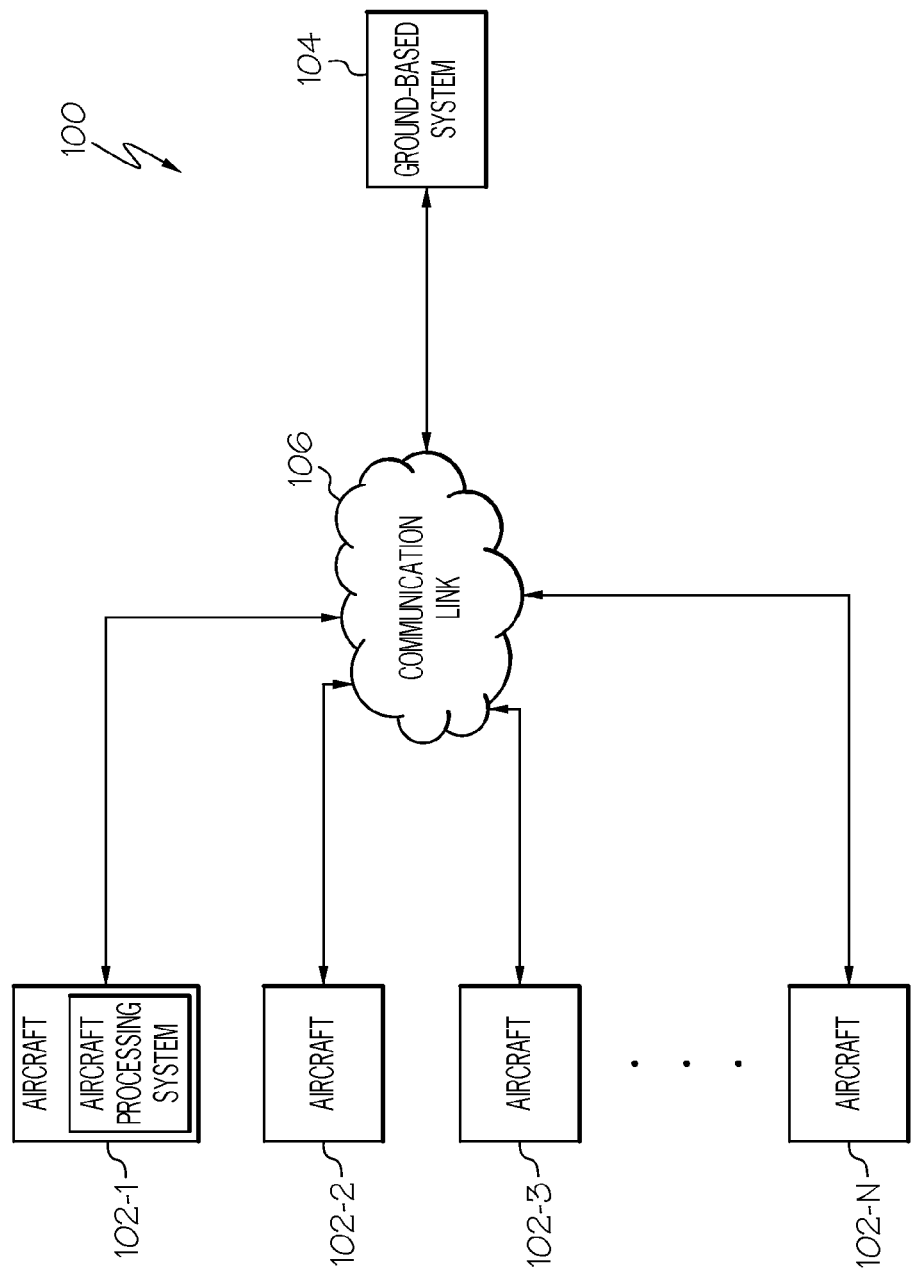
FIG. 1 depicts a simplified representation of a system for processing and transmitting aircraft data.

Referring to FIG. 1, an embodiment of an aircraft data processing and transmission system is depicted. The depicted system 100 includes one or more aircraft 102 (102-1, 102-2, 102-3 ... 102-N), a ground-based system 104, and a communication link 106. The aircraft 102 may be any one of numerous aircraft types and configurations. Each aircraft 102 is, however, a client aircraft. As used herein, the term client aircraft refers to an aircraft that has agreed to transmit aircraft data to, and receive cockpit data (described further below) from, the ground-based system 104.

Each client aircraft 102 includes an aircraft processing system 108 (only one depicted) that is configured to transmit aircraft data (in real-time) to, and receive cockpit data from, the ground-based system 104. The aircraft processing system 108 is additionally configured to at least selectively display at least a portion of the cockpit data it receives. Before proceeding further, it is noted that the term cockpit data, as used herein, refers to data that, when processed by an aircraft processing system 108 in a client aircraft 102, will render one or more images representative of at least portions of the processed aircraft data. An exemplary embodiment of an aircraft data processing system 108 is depicted in FIG. 2, and with reference thereto will now be described.

Each aircraft processing system 108 includes an aircraft transceiver 202, an aircraft connection manager 204, a page request manager 206, a page display manager 208, and an aircraft client connection manager 212. The aircraft transceiver 202 is configured to selectively transmit aircraft data to, and receive cockpit data from, the ground-based system 104. The aircraft transceiver 202 may be implemented using any one of numerous known data transceiver technologies.

The aircraft connection manager 204 is in operable communication with the aircraft transceiver 202. The aircraft connection manager 204 is configured to determine an optimum communication link 106. For example, the aircraft connection manager 204 may determine that one of a satellite link, a cellular link, a WiFi link, or a radio frequency (RF) link is optimum. The aircraft connection manager 204 is additionally configured to command the aircraft transceiver 202 to establish communication with the ground-based system 104 using the optimum communication link 106, and to command the aircraft transceiver 202 to transmit aircraft data to, and receive cockpit data from, the ground-based system 104.

Figure 2:
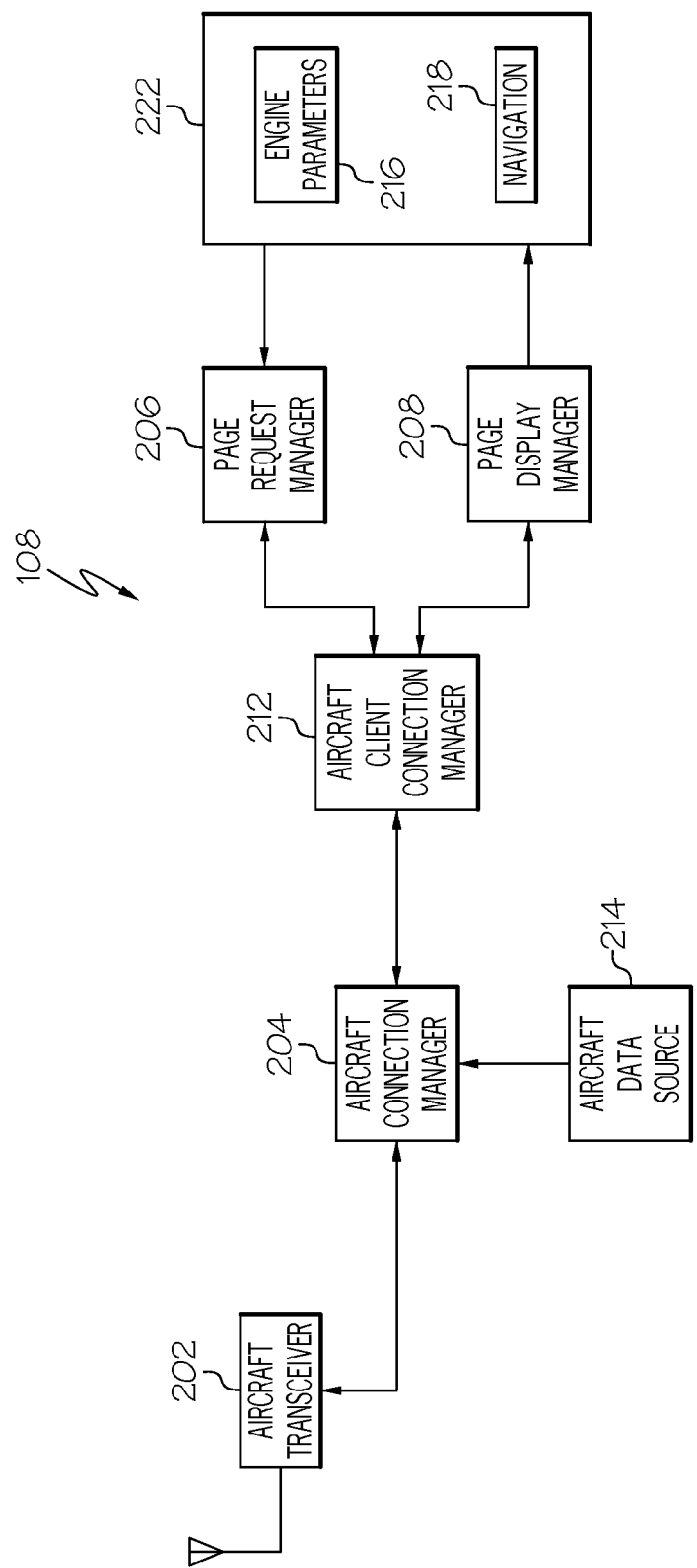
FIG. 2 depicts a functional block diagram of an aircraft-based processing system that may be used to implement the system depicted in FIG. 1.

As FIG. 2 further depicts, the aircraft connection manager 204 is also in operable communication with an aircraft data source 214. The aircraft data source 214, though depicted in FIG. 2 using a single functional block, preferably includes a plurality of sensors, systems, and subsystems that individually and/or collectively supply data representative of environmental conditions (e.g., weather), various engine parameters, navigation, terrain and other obstacles, flight plans, and flight paths, just to name a few.

The page request manager 206 and the display page manager 208 are in operable communication with the aircraft client connection manager 212. These functions work in concert render to one or more images representative of cockpit data, such as an engine parameters page 216 and/or a navigation page 218, on a display 222. More specifically, at least in the depicted embodiment, the page request manager 206 is configured, in response to user input, to selectively supply requests for cockpit data to the aircraft client connection manager 212. The aircraft client connection manager 212, which is also in operable communication with the aircraft connection manager 204, is configured up, upon receipt of the requests for cockpit data, to retrieve the requested cockpit data from the aircraft connection manager and supply the requested cockpit data to the page display manager 208. The page display manager 208 is coupled to receive the requested cockpit data from the aircraft client manager 212 and is configured, upon receipt thereof, to supply commands that cause the display device 222 to render one or more images representative of the cockpit data.

Figure 3:
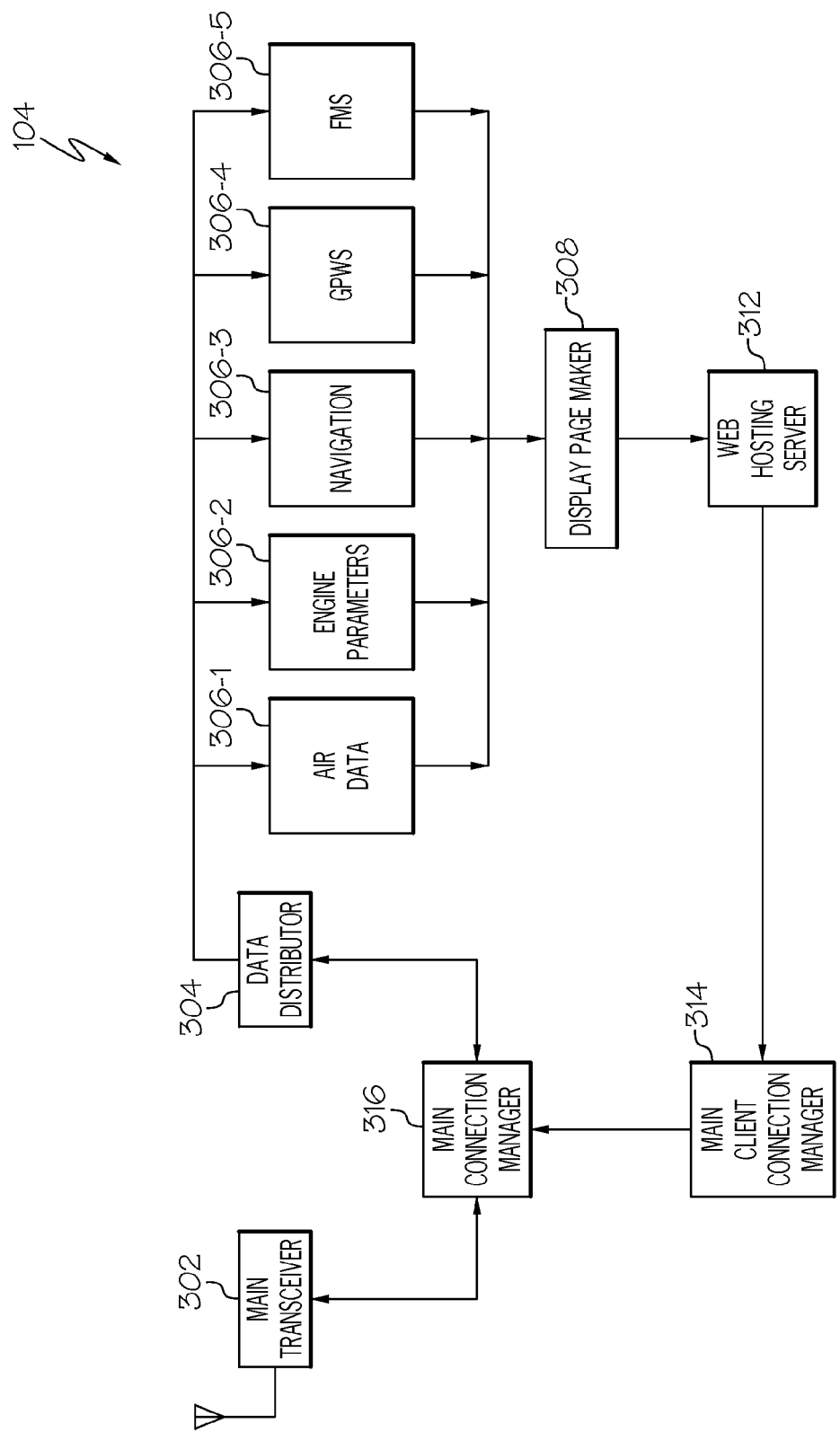
FIG. 3 depicts a functional block diagram of a ground-based system that may be used to implement the system depicted in FIG. 1.

Returning once again to FIG. 1, the ground-based system 104 is configured to receive and process, in real-time, the aircraft data transmitted thereto by each of the client aircraft 102. The ground-based system 104 is additionally configured to selectively transmit cockpit data to one or more of the client aircraft 102. The ground-based system 104 may be variously configured to implement this functionality, but one exemplary embodiment of the ground-based system 104 is depicted in FIG. 3, and with reference thereto will now be described.

The depicted ground-based system 104 includes at least a main transceiver 302, a data distributor 304, a plurality of data processors 306 (306-1, 306-2, 306-3, 306-4, 306-5), and a display page maker 308. As FIG. 3 further depicts, the ground-based system 104 includes a web hosting server 312, a main client connection manager 314, and a main connection manager 316. The main transceiver 302 selectively receives aircraft data that are transmitted from the client aircraft 102 and selectively transmits cockpit data to one or more of the client aircraft 102. The received aircraft data are routed from the main transceiver 302, the main connection manager 316 (described further below) to the data distributor 304. The data distributor 304 is configured, upon receipt of the aircraft data, to parse and distribute the aircraft data to various ones of the data processors 306.

Each of the data processors 306 is in operable communication with, and is coupled to receive a portion of the parsed aircraft data from, the data distributor 304. Each processor 306 is configured to process the portion of the parsed aircraft data it receives and supply processed aircraft data to the display page maker 308. It will be appreciated, that the number and type of data processors 306 may vary depending, for example, on the types of data that comprise the aircraft data. In the depicted embodiment, the aircraft data comprises air data, engine data, navigation data, ground proximity data, and flight management system data. Thus, the processors 306 include an air data processor 306-1, an engine parameters processor 306-2, a navigation data processor 306-3, a ground proximity warning system processor 306-4, and a flight management system processor 306-5.

The air data processor 306-1 receives, via the data distributor 304, various environmental and aircraft-related data from various sensors and data sources onboard the aircraft 102. The air data processor 306-1 is configured, upon receipt of these data, to calculate various air data parameters. The air data parameters may vary, but may include, for example, altitude, altitude rate, airspeed, calibrated airspeed, Mach, true airspeed, airspeed rate, static pressure, total pressure, pressure ratio, temperature, and various other environmental-related parameters.

The engine parameter processor 306-2 is coupled to receive, via the data distributor, various engine parameter data from various engine sensors onboard the aircraft 102. The engine parameter processor 306-2 is configured, upon receipt of these data, to generate engine performance and health data. The engine parameter data may vary, but may include, for example, data representative of fuel flow, oil pressure, oil temperature, cylinder head temperature, exhaust gas temperature, turbine inlet temperature, and vacuum pressure. The engine parameter data are supplied continuously throughout engine operation, from start of the engine till the shutdown of the engine. Any critical situation will be brought to pilot's attention so that the pilot can take appropriate action.

The ground proximity warning system processor 306-3 is coupled to receive, via the data distributor 304, data representative of various aircraft dynamics. The ground proximity warning system processor 306-3 is configured, upon receipt of these data, to selectively generate updated ground proximity warning system data. The data representative of aircraft dynamics may vary, but may include, for example, position, altitude, airspeed and glide slope along the aircraft flight path. The ground proximity warning system processor 306-4, based on these data, can determine whether there is a terrain or an obstacle along the flight path by comparing these data with an existing database that is available, for example, in the ground proximity warning system processor 306-3. If any anomaly is observed by the ground proximity warning system processor 306-3, then it may supply a warning, visual, aural, or both for transmission to one or more of the aircraft 102.

The flight management system processor 306-4 is coupled to receive, via the data distributor 304, various flight-related data and is configured, upon receipt thereof, to selectively generate updated flight management system data. The flight-related data may vary, and may include, for example, IRS (Inertial Reference System) data, WBC (Weight and Balance System/Computer) data, FF/FQ (Fuel Flow/Fuel Quantity) data, various GNSS (Global Navigation Satellite System) and Radios data, such as DME (Distance Measuring Equipment), VOR (VHF Omni-bearing Receiver), ILS (Instrument Landing System), MLS (Microwave Landing System), and ADF/NDB (Automatic Direction Finder/Non-Directional Beacon).

The flight management system processor 306-4 additionally receives, via the data distributor 304, flight plan data representative of aircraft flight plans filed by each aircraft 102. The flight management system processor 306-4 is configured, upon receipt of these data, to compute aircraft flight path along the filed flight plan taking into account all the SIDs, STARs, routes, airways and pilot defined waypoints. In some embodiments, the flight management system processor 306-4 may also compute the pitch, roll, and thrust commands for the autopilot, auto-throttle, and flight director to automatically fly an optimum vertical profile for climb, cruise and descent while simultaneously following the lateral positions of the flight plan. In such embodiments, the flight management system processor 306-4 will continuously compare each aircraft's actual current position with its desired position according to the flight plan and will generate steering commands to the aircraft autopilot to fly the filed flight plan.

The navigation data processor 306-5 is coupled to receive and process various navigation data. The navigation data may vary, but may include, for example, airports, runways, taxiways, NDBs, VORs, ILS fixes, SIDs, STARs, Instrument Approaches and Holding Patterns, which may be stored in the form of database or lookup tables. These data are obtained from various sources such as aeronautical information publications (AIPs), and/or non-governmental agencies such as Jeppesen, Lido, and NavTech. The navigation data processor 306-5 will store, retrieve, and transfer navigation data to other applications or processors, such as the flight management system processor 306-4.

No matter the number and type of data processors 306 that are included, each data processor 306, as noted above, supplies its processed aircraft data to the display page maker 308. The display page maker 308 is coupled to receive the processed aircraft data from the plurality of data processors 306 and is configured, upon receipt thereof, to generate the cockpit data for selective transmission by the main transceiver 302 to the one or more client aircraft 102. The cockpit data are supplied to the main transceiver 302 via the web hosting server 312, the main client connection manager 314, and the main connection manager 316, each of which will now be described.

The web hosting server 312 is in operable communication with the display page maker 308, and is configured to at least temporarily store the cockpit data supplied by the display page maker 308. The main client connection manager 312 is in operable communication with the web hosting server 308 and is configured to retrieve at least selected portions of the cockpit data from the web hosting server 308. The main client connection manager is additionally configured to supply the retrieved cockpit data for transmission to one or more client aircraft, via the main connection manager 316.

The main connection manager 316 is configured similar to the aircraft connection manager 204. In particular, the main connection manager 316 is configured to determine an optimum transmission link 106, command the main transceiver 302 to establish communication with one or more client aircraft 102 via the optimum transmission link 106, and command the main transceiver 302 to receive aircraft data from, and transmit the cockpit data to, one or more client aircraft 102.

The system 100 described herein allows aircraft data to be continuously transmitted from client aircraft 102 to a ground-based system 104. The ground-based system 104 provides real-time data processing of the aircraft data into cockpit data and transmission of the cockpit data back to the client aircraft 102. The system provides significant improvements over legacy data link technology and provides real-time decision support infrastructure for pilots from the ground. Pilot workload during flights may be reduced, while at the same time the information a pilot needs is transmitted regularly or on an as-needed basis.

Those of skill in the art will appreciate that the various illustrative logical blocks, modules, circuits, and algorithm steps described in connection with the embodiments disclosed herein may be implemented as electronic hardware, computer software, or combinations of both. Some of the embodiments and implementations are described above in terms of functional and/or logical block components (or modules) and various processing steps. However, it should be appreciated that such block components (or modules) may be realized by any number of hardware, software, and/or firmware components configured to perform the specified functions. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. For example, an embodiment of a system or a component may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments described herein are merely exemplary implementations.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. An aircraft data processing system, comprising:
    a main transceiver adapted to receive aircraft data transmitted from a plurality of client aircraft and to transmit cockpit data to one or more client aircraft;
    a data distributor coupled to receive the aircraft data received by the main transceiver and configured, upon receipt thereof, to parse the aircraft data into environmental and aircraft-related data, engine parameter data, data representative of various aircraft dynamics, flight-related data, and flight plan data, and to distribute the parsed aircraft data;
    a plurality of data processors in operable communication with the data distributor, each data processor coupled to receive, from the data distributor, a portion of the parsed aircraft data and configured, upon receipt thereof, to process the portion of the parsed aircraft data it receives and supply processed aircraft data; and
    a display page maker coupled to receive the processed aircraft data from the plurality of processors and configured, upon receipt thereof, to generate the cockpit data for transmission by the main transceiver to the one or more client aircraft,
    wherein the cockpit data, when processed in a client aircraft, will render one or more images representative of at least portions of the processed aircraft data, and
    wherein the plurality of data processors comprises:
        an air data processor coupled to receive the environmental and aircraft-related data and configured, upon receipt thereof to calculate various air data parameters,
        an engine parameter processor coupled to receive the engine parameter data and configured, upon receipt thereof, to generate engine performance and health data,
        a ground proximity warning system processor coupled to receive the data representative of various aircraft dynamics and configured, upon receipt thereof, to generate updated ground proximity warning system data,
        a flight management system processor coupled to receive the flight-related data and configured, upon receipt thereof, to generate updated flight management system data, and a navigation data processor coupled to receive the flight plan data and configured, upon receipt thereof, to generate and supply updated navigation data.

2. The system of claim 1, further comprising:

a web hosting server in operable communication with the display page maker, the web hosting server coupled to receive the cockpit data and configured, upon receipt thereof, to at least temporarily store the cockpit data.

3. The system of claim 2, further comprising:

a main client connection manager in operable communication with the web hosting server, the main client connection manager coupled to retrieve at least selected portions of the cockpit data from the web hosting server and configured, upon receipt thereof, to supply the retrieved cockpit data for transmission to one or more client aircraft.

4. The system of claim 3, further comprising:

a main connection manager in operable communication with the main client connection manager and the main transceiver, the main connection manager configured to:
  determine an optimum transmission link,
  command the main transceiver to establish communication with one or more client aircraft via the optimum transmission link, and
  command the main transceiver to receive aircraft data from, and transmit the cockpit data to, one or more client aircraft.

5. The system of claim 1, wherein the main transceiver is configured to transmit and receive via one or more wireless communication links.

6. The system of claim 1, wherein each client aircraft comprises:

an aircraft transceiver configured to transmit aircraft data to, and receive cockpit data from, the main transceiver.

7. The system of claim 6, wherein each client aircraft further comprises:

an aircraft connection manager in operable communication with the aircraft transceiver and configured to:
  determine an optimum transmission link,
  command the aircraft transceiver to establish communication with the main transceiver via the optimum transmission link, and
  command the aircraft transceiver to transmit aircraft data to, and receive cockpit data from, the main transceiver.

8. The system of claim 7, wherein each client aircraft further comprises:

a page request manager configured to supply requests for cockpit data in response to user input;

a page display manager coupled to receive requested cockpit data and configured, upon receipt thereof, to supply commands that cause a display device to render one or more images representative of the cockpit data;

an aircraft client connection manager in operable communication with the aircraft connection manager, the page request manager, and the page display manager, the aircraft client connection manger configured to (i) receive the requests for cockpit data, (ii) retrieve the requested cockpit data from the aircraft connection manager, and (iii) supply the requested cockpit data to the page display manager.

* * * * *